US006980497B2

(12) United States Patent
Tsukihashi et al.

(10) Patent No.: US 6,980,497 B2
(45) Date of Patent: Dec. 27, 2005

(54) OPTICAL DISK RECORDING APPARATUS AND CONTROL METHOD THEREOF

(75) Inventors: Akira Tsukihashi, Gunma (JP); Michiyoshi Sawada, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 591 days.

(21) Appl. No.: 10/253,451

(22) Filed: Sep. 24, 2002

(65) Prior Publication Data

US 2003/0067852 A1   Apr. 10, 2003

(30) Foreign Application Priority Data

Oct. 10, 2001  (JP)  ............................. 2001-312578
Oct. 16, 2001  (JP)  ............................. 2001-318015

(51) Int. Cl.[7] .............................................. G11B 7/00
(52) U.S. Cl. ............................. 369/44.38; 369/47.55; 369/116
(58) Field of Search .............................. 369/47.5, 116, 369/120, 121, 122, 44.38, 47.53, 47.52, 47.55, 369/44.41, 44.42

(56) References Cited

U.S. PATENT DOCUMENTS 4,670,869 A * 6/1987 Chen ...................... 369/112.05
4,980,878 A * 12/1990 Szerlip .................... 369/53.15
5,043,960 A * 8/1991 Nakao et al. ............. 369/13.02
6,577,570 B2 * 6/2003 Lee et al. ................. 369/47.53

\* cited by examiner

*Primary Examiner*—Nabil Hindi
(74) *Attorney, Agent, or Firm*—Hogan & Hartson, LLP (57) ABSTRACT

An optical system of an optical disk recording apparatus irradiates a disk with a main beam for use in writing a data signal onto a disk and a sub-beam succeeding the main beam. When writing a data signal onto the disk, a site on the disk at which a data signal is written by the main beam is subsequently irradiated with the succeeding sub-beam. Light of the succeeding sub-beam reflected from the disk is received by a succeeding light receiving sub-region. A sampling circuit samples a signal at periods when the emission power of the main beam is at the recording level, among output signals from the succeeding light receiving sub-region. Based on the sampled signal at the recording level, a β value detection circuit and a jitter amount detection circuit obtain a β value and a jitter amount indicative of the recording state of the data signal recorded on the disk, respectively.

20 Claims, 7 Drawing Sheets

OPTICAL DISK RECORDING APPARATUS AND CONTROL METHOD THEREOF

BACKGROUND OF THE INVENTION

1. Field of the Invention

The present invention relates to an optical disk recording apparatus for recording a data signal onto a disk using an optical beam emitted from an optical head, and more particularly to an optical disk recording apparatus capable of switching a recording speed for data recording onto a disk.

2. Description of Related Art

CD-R/RW drives for CD-R (Recordable) and CD-RW (ReWritable) systems of the CD family are well known optical disk recording apparatuses for recording a digital data signal onto a disk using an optical beam emitted from an optical head. In these optical disk recording apparatuses, attempts are being made to achieve higher recording speeds.

At present, the maximum recording speed for CD-R has reached a speed which is 20 or 24 times the normal speed (hereinafter referred to as "20×" or "24×") and the maximum recording speed for CD-RW has reached 10× speed. In particular, with regard to CD-R for which the maximum recording speed has reached the speed 20× or 24×, a control method of CAV (Constant Angular Velocity) for controlling a rotation speed of a disk at a constant angular velocity or ZCLV (Zone Constant Linear Velocity) in which a disk is divided into a plurality of zones and each zone is controlled at a different constant linear velocity, is typically employed in view of acceleration and deceleration of disk rotation.

Here, materials used for disks onto which data is recorded by such an optical disk recording apparatus differ depending on manufacturer and grade (corresponding to speed), and this further results in variations in recording properties such as sensitivity and frequency characteristics. Furthermore, the recording properties may vary due to manufacturing variations, or may vary in different portions of a single disk due to the non-uniformity of these portions Therefore, in optical disk recording apparatuses, compensation is made for the recording properties of a disk in accordance with the recording speed so that preferable recording can be performed. Specifically, a data signal is actually recorded onto a disk at a determined recording speed and then read by an optical head, and a HF (high frequency) signal obtained from the optical head is used to detect the recording state of the disk. Then, the emission power (laser power) of the optical head is controlled based on the detected recording state, to thereby compensate for the recording properties of the disk corresponding to the recording speed.

The emission power of the optical head is generally set through detection of a β value (the recording depth) from peak and bottom values of a HF signal read out from the disk. It is also possible to detect a jitter amount contained in the HF signal for determining the emission powers of the optical disk. The setting of emission power is performed as follows. Specifically, when starting a recording operation, test signals are written into a Power Calibration Area (which is provided separately from a program area for use in writing of data signals) of a disk while emission powers are changed stepwise, and the writing results are read by the optical head to obtain a HF signal. The emission power control is performed based on this HF signal.

However, even when the emission power of the optical head is set at an optimal level for disk recording in accordance with the recording speed, the following problems will occur if the disk is not adaptable to the set recording speed or has inferior quality. Namely, in such a case, even if recording is successfully performed, the data signal recorded on the disk cannot be read.

Here, the data signal recorded on the disk cannot be read mainly because a great amount of jitter is contained in the HF signal read from the disk.

Accordingly, by reducing a jitter amount in the HF signal, recording failure caused by the fact that data signals recorded on the disk cannot be read can be significantly decreased.

Because the jitter amount of HF signal cannot be reduced simply by controlling the emission power of the optical head, however, other solutions have been desired.

Further, during disk recording operation, emission power control of the optical head, referred to as Running OPC (Optimum Power Control), may be performed. For Running OPC, it is necessary to detect the recording state of a data signal upon recording the data signal on the disk in the disk recording operation. Conventionally, the recording state of data signal is detected from reflection of an optical beam used for recording (namely, a beam at recording level).

According to the above-described conventional method, however, detection of recording state is not based on actual reading of data signals recorded on the disk. Further, this method does not enable extraction of a jitter component contained in the read HF signal. For these reasons, with this conventional method there are cases wherein the emission power of the optical head cannot be set at the actual optimum recording level. In such cases, recording in accordance with the recording properties of the disk is impossible and recording will fail.

Also, optical disk recording apparatuses have the following problems, when the CAV or ZCLV method is employed so as to increase the recording speed. Specifically, according to these methods, because it is necessary to change data for setting the emission power of the optical head in accordance with the recording speed which changes in accordance with the diameter of the disk, data required for Running OPC cannot be obtained.

SUMMARY OF THE INVENTION

In accordance with one aspect of the present invention, an optical system of an optical disk recording apparatus diffracts an optical beam emitted from a light source to form a main beam for use in writing a data signal on a disk and a succeeding sub-beam succeeding the main beam, and irradiates the disk with the main beam and the succeeding sub-beam. The positional relationship of the main beam and the sub-beam is defined such that when writing a data signal on the disk, a site on the disk at which a data signal is written by the main beam is subsequently irradiated with the succeeding sub-beam. Further, the optical disk recording apparatus includes a photodetector having a succeeding light receiving sub-region for detecting reflection light of the succeeding sub-beam reflected from the disk, a first light source control circuit for controlling switching of an emission power of the light source between a recording level for forming a recording mark on the disk and a recording pause level for not forming a recording mark on the disk in accordance with a data signal to be written on the disk, a sampling circuit for sampling a signal at periods when the emission power of the light source is at predetermined one of the recording level and the recording pause level, among detection signals output from the succeeding sub-beam receiving region of the photodetector, and a recording state detection circuit for detecting the recording state of a data signal written on the disk with the main beam, based on an signal output from the sampling circuit. With this configuration, when recording a data signal on the disk using the main beam, a light amount of the succeeding sub-beam changes with the level change of the emission power from the light source. According to the present invention, however, because the recording state is detected based only on signals at periods when the emission power of the light source is at the same level, the recording state of the data signal recorded on the disk can be detected correctly without being affected by change in the level of the emission power.

Further, in accordance with another aspect of the present invention, the recording state detection circuit includes a jitter amount detection circuit, and a speed control circuit controls the recording speed for recording a data signal on the disk in accordance with the jitter amount of the data signal on the disk detected by the jitter amount detection circuit. In one aspect of the present invention, when disk recording is performed using a disk rotation method which corresponds to the maximum recording speed for controlling the rotation speed of the disk, the speed control circuit switches the disk rotation control method from that method to another disk rotation method which corresponds to lower recording speeds, if the jitter amount detected by the jitter amount detection circuit is determined to be outside a preset allowable range.

BRIEF DESCRIPTION OF THE DRAWINGS

These and other objects of the invention will be explained in the description below, in connection with the accompanying drawings, in which.

DETAILED DESCRIPTION OF THE PREFERRED EMBODIMENTS

Figure 1:
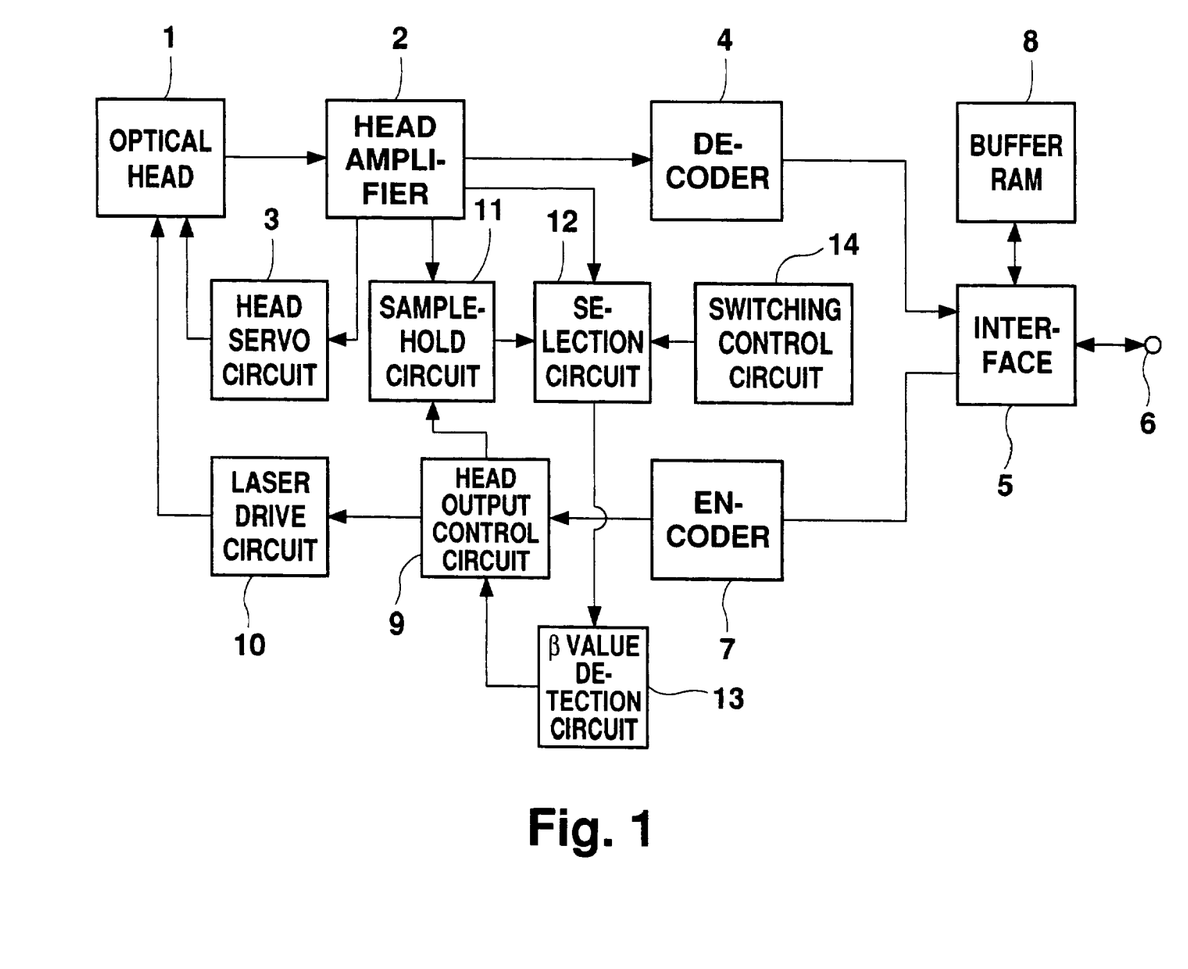
FIG. 1 is a block diagram showing a configuration of principal portions of an optical disk recording apparatus according to the present invention.

FIG. 1 is a block circuit diagram showing one embodiment of a CD-R drive which implements a method of controlling the emission power of an optical head of an optical disk recording apparatus according to the present invention.

Referring to FIG. 1, an optical head 1 emits a beam of focused laser light (a laser beam) which traces a signal track for writing and reading data to or from a disk.

Figure 2:
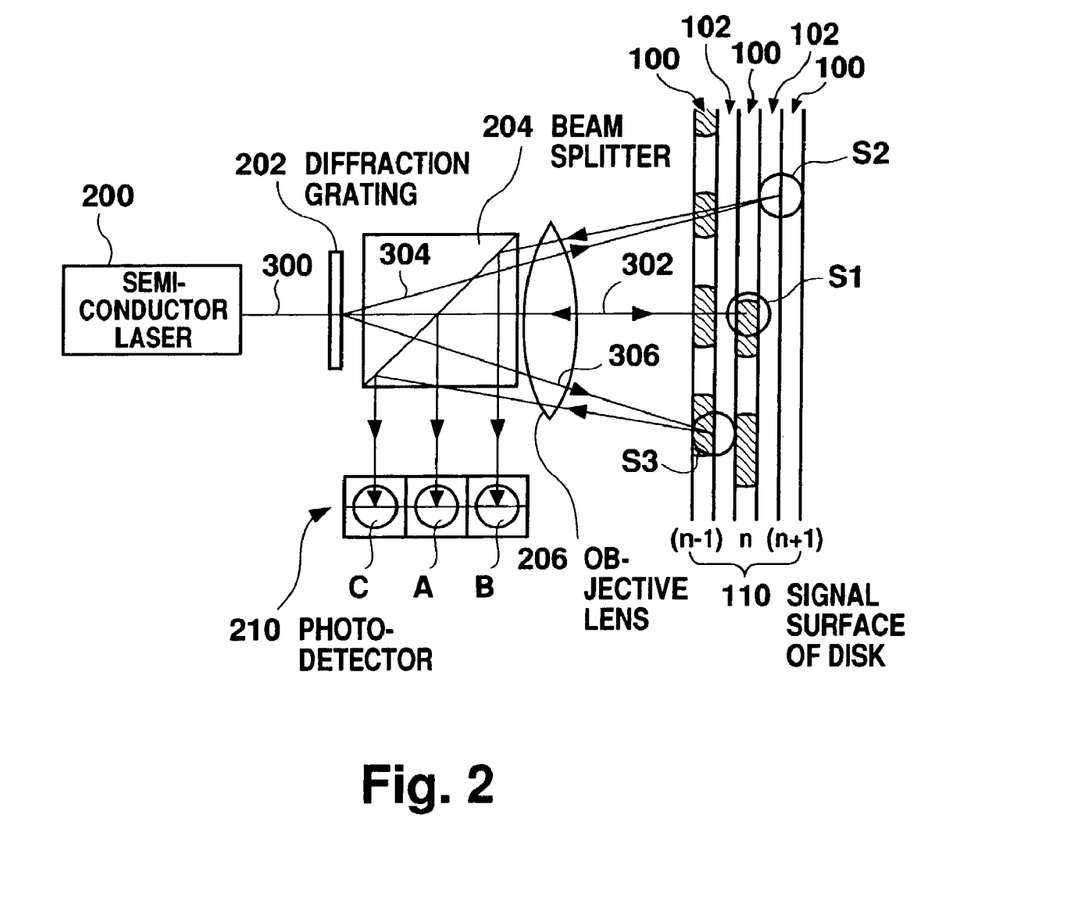
FIG. 2 is a schematic diagram showing a configuration of an optical head of the optical disk recording apparatus of FIG. 1.
Figure 3:
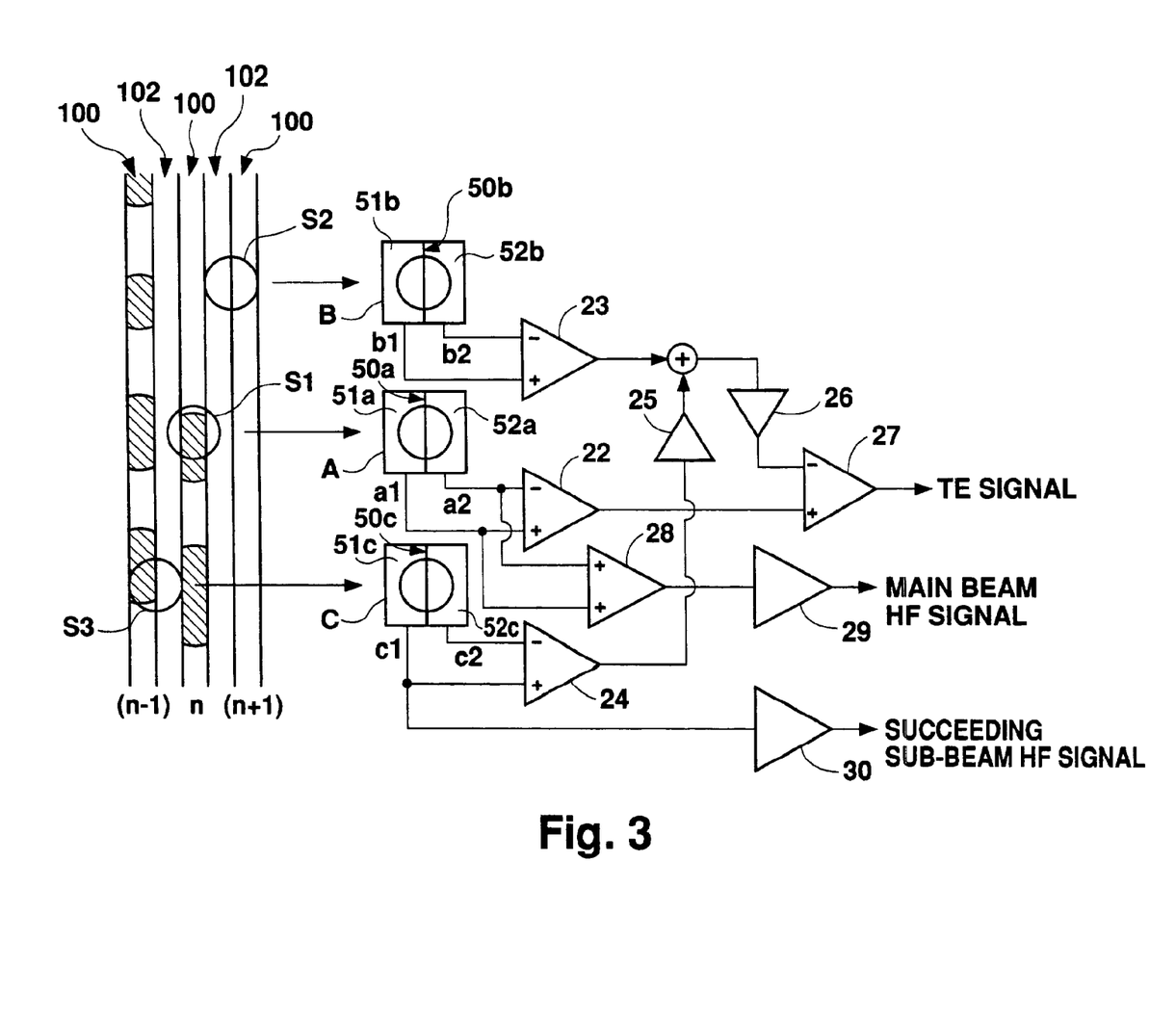
FIG. 3 is a diagram showing a configuration of a circuit for extracting various signals from an output signal of each light receiving region of a photodetector, in the optical disk recording apparatus of FIG. 1.

FIG. 2 is a diagram for explaining an example configuration of the optical head 1. In FIG. 2, which is a schematic drawing, the size and positional relationship of the respective elements are not drawn to scale and do not represent the dimensions of an actual apparatus. Further, FIG. 3 shows a configuration of a circuit forming a part of the apparatus of FIG. 1, namely a configuration of a signal reading circuit which generates a signal necessary for various controls from a signal detected by a photodetector 210 of the optical head 1. The configuration shown in FIG. 2 is an example in which the Differential Push-pull method is used for tracking control.

Referring to FIG. 2, a laser beam 300 emitted from a semiconductor laser 200 of the optical head 1 is diffracted by a diffraction grating 202, so that a main beam 302 which is a 0th order diffraction beam, a preceding sub-beam 304 which is a +1st order diffraction beam, and a succeeding sub-beam 306 which is the −1st order diffraction beam are formed. The main beam 302 is used for writing a recording signal onto a disk and for reading a signal recorded on the disk. The preceding sub-beam 304 and the succeeding sub-beam 306 are used for tracking control. Further, the succeeding beam 306 is also used for detecting the recording state of a signal recorded on the disk by the main beam 302.

In the present specification, when expressions such as "the sub-beam succeeding the main beam" or "the succeeding sub-beam" are used, it is assumed that the positional relationship of the sub-beam with regard to the main beam is set such that, when recording or reproducing data with regard to the disk, a site or a spot irradiated with the main beam is subsequently irradiated with the sub-beam. Further, when an expression of "the sub-beam preceding the main beam" or simply "the preceding sub-beam" is used, it is assumed that the positional relationship of the sub-beam with regard to the main beam is set such that, when recording or reproducing data with regard to the disk, a site or a spot first irradiated with the sub-beam and then subsequently irradiated with the main beam.

Each beam 302, 304, or 306 reaches a signal surface 110 of the disk through a beam splitter 204 and an objective lens 206.

In FIGS. 2 and 3, an optical spot S1 is an irradiation spot formed on the signal surface 110 by the main beam 302. Similarly, an optical spot S2 is an irradiation spot formed on the optical surface 110 by the preceding sub-beam 304 and an optical spot S3 is an irradiation spot formed on the optical surface 110 by the succeeding sub-beam 306.

FIGS. 2 and 3 show a state in which the optical spot S1 formed by the main beam 302 is correctly positioned such that the center of the optical spot S1 is on the center line of the n-th track 100 of the signal surface 110 of the disk. (This state is called the "on-track state"). In this example, the signal tracks 100 of the disk and the interval 102 between adjacent tracks have substantially the same width. In the configuration shown in FIGS. 2 and 3, the optical spots S2 and S3 are located at symmetrical positions with regard to the optical spot S1. Of these optical spots S2 and S3, the spot S2 is positioned such that the half of its area which is further from the spot S1 is located on the (n+1)-th signal track which is adjacent, on the outer side, to the n-th signal track and the other half is located on the interval 102 between the n-th and (n+1)-th signal tracks. On the other hand, the spot S3 is positioned such that the half of its area which is further from the spot S1 is located on the (n−1)-th signal track which is adjacent, on the inner side, to the n-th signal track and the other half thereof is located on the interval 102 between the n-th and (n−1)-th signal tracks. The optical system of the optical head 1 is set so that the optical spots S2 and S3 have such a positional relationship with regard to the optical spot S1, as shown FIGS. 2 and 3.

Reflection light of the optical spots S1, S2 and S2 reflected from the signal surface 110 of the disk is returned to the beam splitter 204 through the objective lens 206, and then further reflected by the beam splitter 204 and guided to the photodetector 210. The photodetector 201 includes a main light receiving region A and light receiving sub-regions B and C. The main light receiving region A receives reflection light of the main beam 302. The light receiving sub-regions B and C receive light reflected from the preceding and succeeding sub-beams 304 and 306, respectively.

As shown in FIG. 3, each of the main light receiving region A and a pair of the light receiving sub-regions B and C is divided into at least two segments by a dividing line 50a, 50b, or 50C which extends in the direction corresponding to the extending direction of the signal track 100 of the disk. Each segment 51a, 52a, 51b, 52b, 51c, and 52c of the main light receiving region A and a pair of the light receiving sub-regions B and C produces an output corresponding to the amount of received light.

Referring back to FIG. 1, a head amplifier 2 uses an output from a predetermined light receiving region of the photodetector of the optical head 1 to generate, amplify and binarize a HF (high frequency) signal corresponding to a data signal recorded on the disk. The head amplifier 2 also generates a focus error signal indicative of a focus error of the main beam 302 with regard to the signal surface of 110 of the disk and a tracking error signal indicative of a tracking error of the main beam 302 with regard to the signal track 100 of the disk. A head servo circuit 3 performs focus control for focusing the main beam into the signal surface of the disk in accordance with the focus error signal and tracking control for causing the main beam to track the signal track of the disk in accordance with the tracking error signal. The head servo circuit 3 also performs thread feeding control for moving the optical head 1 in the radial direction of the disk.

A decoder 4 demodulates the digitized data of the HF signal output from the head amplifier 2 in synchronization with a bit clock. More specifically, the decoder 4 demodulates the input digital data of the HF signal in accordance with EFM (Eight to Fourteen Modulation) which is a modulation method under the CD standard, and also demodulates various data in accordance with the data structure using the EFM demodulation results.

An interface 5 controls data transmission and reception to and from a master device, such as a personal computer, which is connected via a connection terminal 6. An encoder 7 encodes data input through the interface 5 into a data structure suitable for recording onto the disk and demodulates the encoded data into an EFM signal corresponding to a modulation code of the CD standard.

A buffer RAM 8 caches data input through the interface 5 for use by the encoder 7, which modulates the data into recording data to be recorded onto the disk, and also caches data read from the disk for use by the decoder 4, which demodulates the data.

A head output control circuit 9 generates a control output for controlling a laser beam emitted from the optical head 1 based on the EFM data output from the encoder 7. A laser drive circuit 10 drives a laser source of the optical head 1 for recording data onto the disk in accordance with the control output supplied from the head output control circuit 9.

A sample-hold circuit 11 samples and holds the HF signal (which will be described in detail below) obtained from the succeeding sub-beam. A selection circuit 12 selectively outputs the HF signal which is sampled and held and supplied through the sample-hold circuit 11 or the HF signal obtained from the main beam and supplied from the head amplifier 2 to circuits provided downstream. A β value detection circuit 13 detects a peak value Vmax and a bottom value Vmin of the HF signal selected by the selection circuit 12 and detects a β value from these values. The β value detection circuit 13 controls the head output control circuit 9 based on the detected β value for setting the emission power of the optical head 1 when recording data.

A sampling period and a holding period of the sample-hold circuit 11 are set in accordance with the EFM recording signal output from the head output control circuit 9.

A switching control circuit 14 switches the selection circuit 12 in accordance with the setting of a reproduction mode for reproducing a test signal written on the calibration area of the disk at the start of recording or a recording mode for actually recording data onto the program area of the disk. Specifically, the switching control circuit 14 causes the selection circuit 12 to select an output signal of the main light receiving region A, which is amplified by the head amplifier, when the operation mode of the apparatus is the reproduction mode, and to select a signal from the sample-hold circuit 11 when the operation mode is the recording mode.

Referring to FIG. 3, generation of a tracking error signal and an HF signal related to the gist of the present invention will first be described. It should be noted that although at least the main light receiving region A of the photodetector is divided crosswise into four segments when the astigmatic method is used for focus control, the photodetector is drawn as shown in FIG. 3 for simplification of description because generation of a focus error signal will not be described in the following.

The segment regions 51a and 52a of the main light receiving region A of the photodetector generate outputs a1 and a2, respectively. The segment regions 51b and 52b of the light receiving sub-region B generate outputs b1 and b2, respectively, and the segment regions 51c and 52c of the light receiving sub-region C generate outputs c1 and c2, respectively.

A differential amplifier 22 generates a differential output between the outputs a1 and a2 generated from the respective segment regions of the main light receiving region A. A differential amplifier 23 generates a differential output between the outputs b1 and b2 generated from the respective segment regions of the light receiving sub-region B. A differential amplifier 24 generates a differential output between the outputs c1 and c2 generated from the respective segment regions of the light receiving sub-region C.

The differential output between the outputs b1 and b2 obtained by the differential amplifier 23 and the differential output between the outputs c1 and c2 obtained by the differential amplifier 24 are added together after the level of the output from one differential amplifier 24 is adjusted by an amplifier 25 so as to match the levels of the outputs from both differential amplifiers 23 and 24. The result of this addition is then subjected to level adjustment so as to correspond with the level of the differential output between the outputs a1 and a2 obtained from the differential amplifier 22, and then supplied to a differential amplifier 27.

The differential amplifier 27 generates a differential signal using the output of the amplifier 26 and the output (a1–a2) from the differential amplifier 22. The output signal from the differential amplifier 27 is a tracking error signal (TE signal) corresponding to a tracking error, whose output level and polarity vary in accordance with a shift amount and a shift direction between the main beam emitted from the optical head and the signal track of the disk.

The outputs a1 and a2 from the respective segment regions of the main light receiving region A are added by an addition amplifier 28, which outputs a HF signal of the disk which is read using the main beam and corresponds to the signal recorded on the disk. The HF signal is then amplified by a HF amplifier 29 before being supplied to the decoder 4.

As described above, the half of the optical spot S3 which is further from the optical spot S1 is emitted onto the (n−1)-th signal track adjacent, on the inner peripheral side, to the n-th track on which the optical spot S1 of the main beam is formed. Therefore, the output c1 generated from the one segment region 51c of the light receiving sub-region C is a HF signal corresponding to a signal recorded on the disk by the main beam. This HF signal is then amplified by a HF amplifier 30.

As already described, in the on-track state wherein the optical spot S1 of the main beam 302 is accurately located on the n-th signal track of the disk, the half of the optical spot S3 of the succeeding sub-beam 306 which is further from the optical spot S1 is set to be located on the (n−1)-th track which is adjacent, on the inner peripheral side, to the n-th signal track. In order to achieve this setting, the amplitude of the output c1 from one segment region 51c of the light receiving sub-region C, namely the amplitude of the HF signal of the disk which is read using the succeeding sub-beam is monitored, and the optical system of the optical head is controlled so as to maximize the amplitude of the HF signal.

Although in FIG. 3, the half of the optical spot S3 which is further from the optical spot S1 is located on the (n−1)-th signal track which is adjacent, on the inner peripheral side, to the n-th signal track, it is also possible to change the angle of each sub-beam such that the half of the optical spot S3 which is closer to the optical spot S1 is located on the adjacent (n−1)-th track. In such a case, a HF signal of the disk can be read by the output c2 from the segment region 52c of the light receiving sub-region C corresponding to the half of the optical spot S3 which is closer to the optical spot S1, and a HF signal with a good quality having the maximum amplitude can be obtained using the output c2.

With the arrangement of the optical spots shown in FIG. 3, although the level of the tracking error signal is approximately a half of the maximum level of the tracking error signal obtained when each optical spot S2, S3 is located on the center of the interval 102 between the corresponding signal tracks, the HF signal with the maximum amplitude can be read using the succeeding sub-beam.

The recording operation of the disk recording apparatus configured as shown in FIG. 1 will next be described.

Data to be recorded is transmitted from the master device connected to the connection terminal 6, received by the interface 5, and then written into the buffer RAM 8.

When the amount of data stored in the buffer RAM 8 reaches an amount for triggering encoding operation by the encoder 7, the encoder 7 reads out data from the buffer RAM 8 and modulates the data into an EFM signal to be recorded onto the disk by EFW frame units.

The head output control circuit 9 generates an EFM recording signal which is converted from the EFM signal output from the encoder 7 for allowing disk recording at the optimum recording level in accordance with the β value detected by the β value detection circuit 13. The EFM recording signal is composed of an "H" signal of the recording level for forming a recording mark on the disk and an "L" signal of the recording pause level (for example, the reproducing level at the time of disk reproduction). The laser drive circuit 10 drives the laser source of the optical head 1 in accordance with the EFM recording signal, so that the recording mark is formed on the signal track of the disk to achieve recording onto the disk.

Further, the emission power from the optical head 1 is set at the optimum recording level for disk recording by means of the head output control circuit 9. This setting is performed based on the β value detected by the β value detection circuit 13.

The detection of β value by the β value detection circuit 13 is performed using the HF signal read by the main beam or the HF signal read by the succeeding sub-beam, which is selected by the selection circuit 12.

More specifically, when reproducing the test signal recorded by test writing in the calibration area of the disk at the start of recording, the selection circuit 12 selects the HF signal read by the main beam, and the β value detection circuit 13 detects a β value of this HF signal read by the main beam.

When actually recording data onto the program area of the disk, on the other hand, the selection circuit 12 selects the HF signal read by the succeeding sub-beam, and the β value detection circuit 13 detects a β value using this HF signal.

Here, because in actual recording the emission power of the optical head 1 is changed in accordance with the EFM recording signal to be recorded onto the disk, the laser amount of the succeeding sub-beam also varies in accordance with the EFM recording signal. It is therefore not possible to obtain an accurate HF signal from the adjacent track on the inner peripheral side of the disk simply by extracting a reflection amount of the succeeding sub-beam from the corresponding light receiving region.

In order to obtain an appropriate HF signal from the adjacent track on the inner peripheral side of the disk using the succeeding sub-beam in such a state, according to the present invention, a HF signal which is read using the succeeding sub-beam is sampled at periods when the level of the emission power of the optical head 1 when recording is at a predetermined one of either the recording level or the reproducing level.

The sample-hold circuit 11 as shown in FIG. 1 is provided so that such HF signal sampling can be performed. The sampling period and the holding period of this sample-hold circuit 11 are set in accordance with the EFM recording signal generated from the head output control circuit 9. The sample-hold circuit 11 samples a HF signal when the EFM recording signal is at the recording level, and holds a HF signal which is sampled during the sampling period when the EFM recording signal is at the reproducing level.

Figure 4:
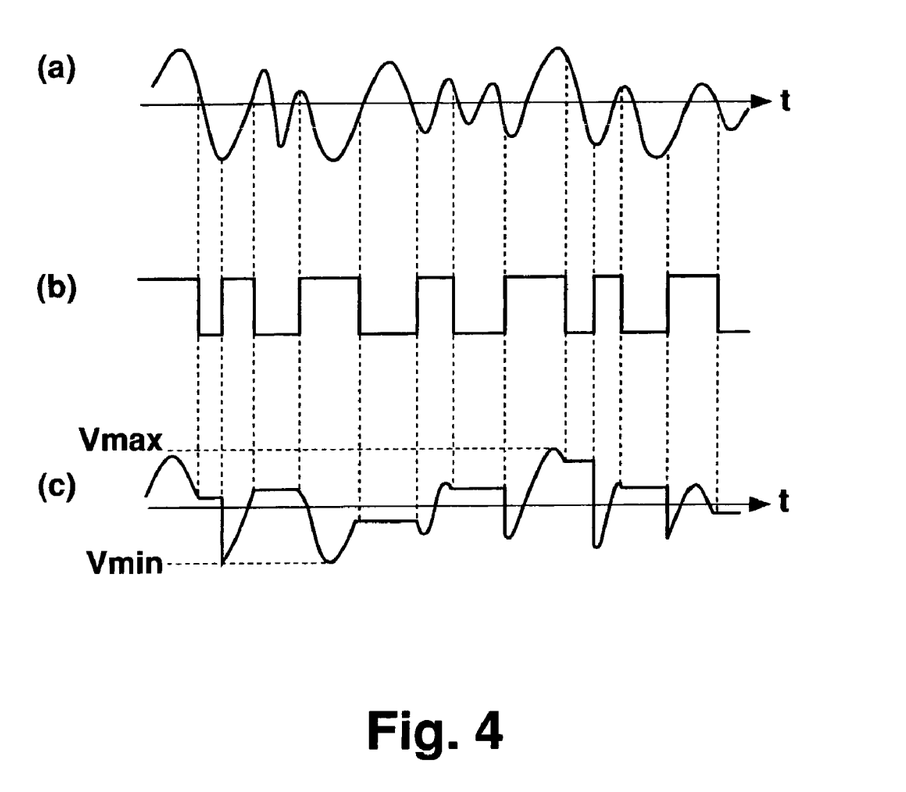
FIG. 4 is a diagram for explaining a signal output from a sample-hold circuit 11 of the apparatus of FIG. 1.

As shown in FIG. 4, when the output c1 from the segment region of the light receiving sub-region C corresponding to the half portion of the optical spot S3 which is further from the optical spot S1, namely the HF signal read from the succeeding sub-beam, has a waveform (a) as shown in FIG. 4 and the EFM recording signal generated from the head output control circuit 9 has a pulse waveform (b) as shown in FIG. 4, the HF signal is converted to have the waveform (c) as shown in FIG. 4 by means of the sample-hold circuit 11. Although the waveform information of this converted HF signal at the holding period is not obtained, the peak level Vmax and the bottom level Vmin of the HF signal can be detected because there is no relevance between the EFM recording signal corresponding to the n-th track and the recorded mark on the adjacent (n−1) track. Consequently, a β value is detected by the β value detection circuit 13 using the HF signal which reflects the EFM recording signal actually recorded onto the disk.

As described above, according to the apparatus of the present invention, when recording data onto the program area of the disk, the emission power from the optical head 1 is set by the head output control circuit 9 in accordance with the β value obtained from the HF signal which is read from the EFM recording signal actually recorded on the previous track of the disk. With such a setting, the recording level is optimized for recording data onto the disk.

Further, although the light amount of the sub-beam may be, for example, approximately one tenth that of the main beam, because the HF signal is sampled when the EFM recording signal is at the recording level, the light amount of the succeeding sub-beam is large during the sampling period. As such, the readout HF signal has a preferable S/N ratio.

Although in the foregoing embodiment, the ±1st order beams of a diffraction beam are used as sub-beams for reading a signal recorded on the disk, it is also possible to instead use the second or higher order beam of a diffraction beam, although in such a case the amount light is decreased. In such a case, it is possible to achieve the arrangement of the ± first order beams which gives priority to the tracking control, so that a good quality tracking error signal can be obtained.

Figure 5:
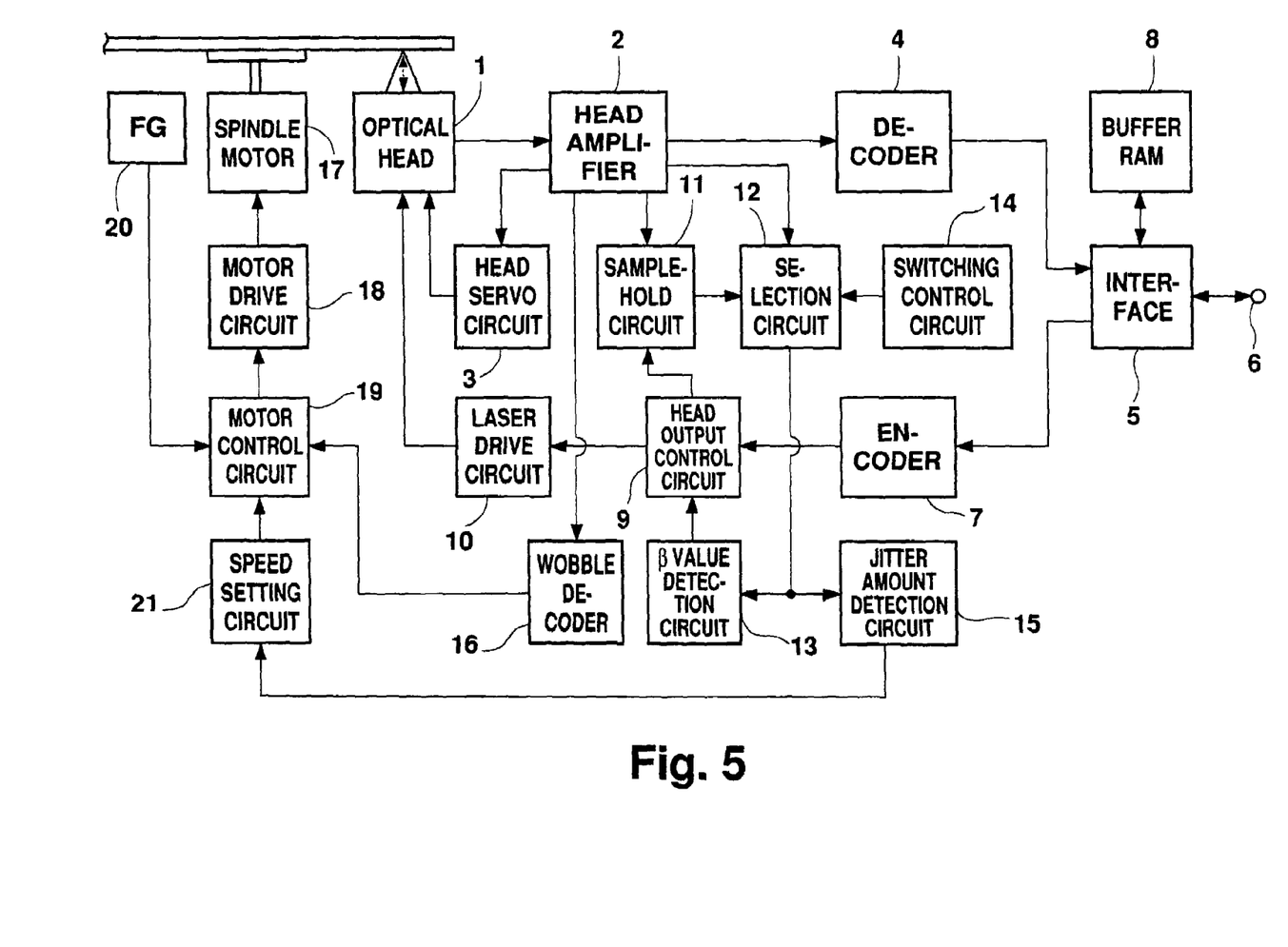
FIG. 5 is a block diagram showing a configuration of principal portions of a variation of an optical disk recording apparatus according to the present invention.
Figure 6:
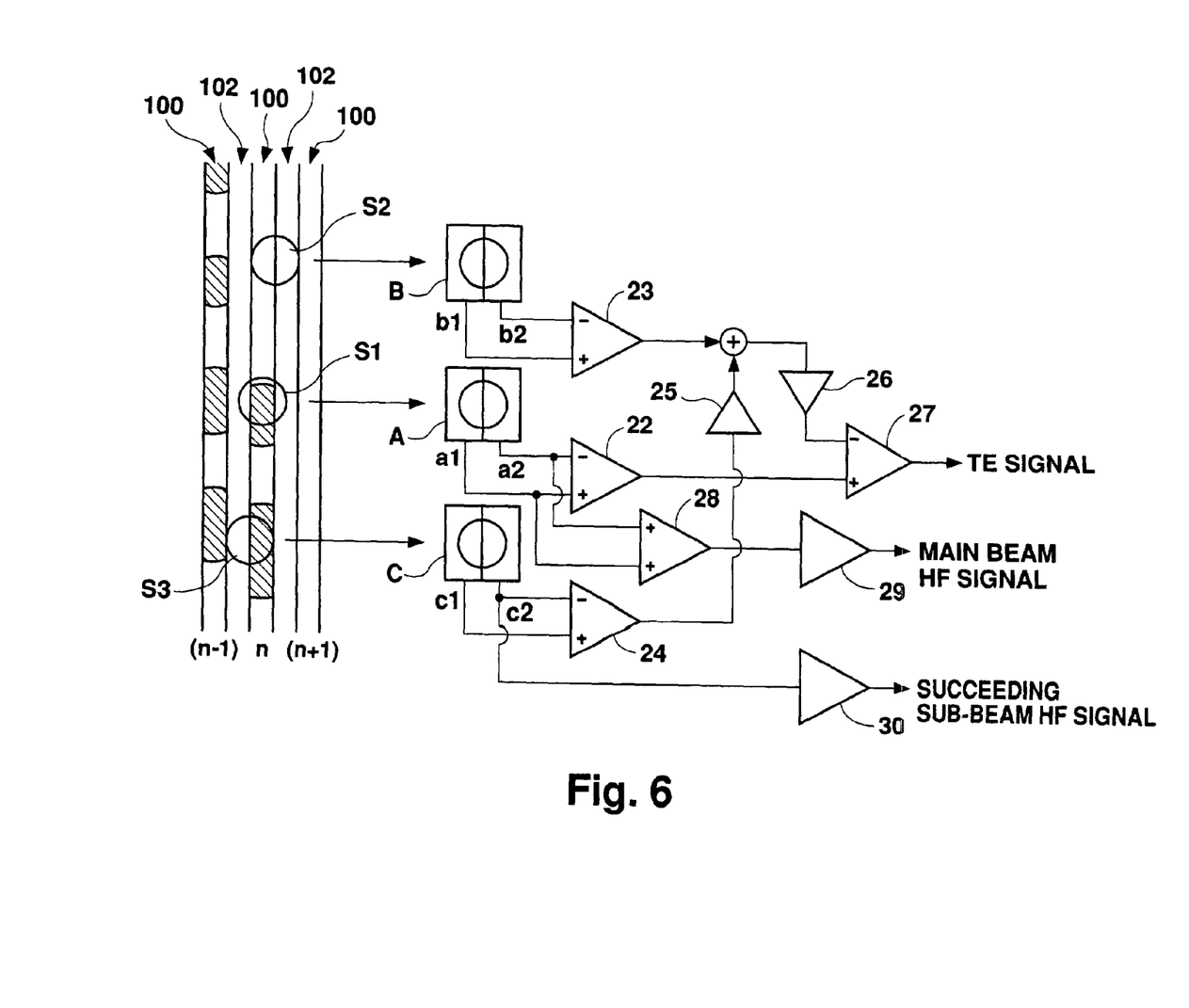
FIG. 6 is a diagram showing a configuration of a circuit for extracting various signals from an output signal of each light receiving region of a photodetector, in the optical disk recording apparatus of FIG. 5.

A variation example of the present invention will be described with reference to FIGS. 5 to 7. In FIGS. 5 and 6, elements identical or similar to those in FIGS. 1 and 3 are denoted with the same numerals and will not be described.

Further, while the basic configuration of the optical system of the optical head 1 used in this modification is similar to that shown in FIG. 2, the positional relationship of the 0th order beam and the ±1st order diffraction beams to be formed differs from that shown in FIG. 2. More specifically, in this modification, as shown in FIG. 6, in the on-track state in which the optical spot S1 is accurately located on the n-th signal track of the disk, the optical spot S2 on the outer peripheral side of the disk is located such that a half of its area, that on the inner peripheral side, is projected on the n-th signal track and the other half on the outer peripheral side is projected onto the interval 102 between the n-th signal track and the (n+1)-th signal track adjacent, on the outer peripheral side, to the n-th track, and the optical spot S3 on the inner peripheral side of the disk is located such that an outer peripheral half portion thereof S3 is projected onto the n-th signal track and an inner peripheral half portion thereof is projected onto the interval 102 between the n-th signal track and the (n−1)-th signal track adjacent, on the inner peripheral side, to the n-th track.

In the configuration shown in FIG. 5, a jitter amount detection circuit 15 extracts a jitter component from a HF signal selected by the selection circuit 12 and detects a time width of the jitter component to thereby detect a jitter amount. More specifically, the jitter amount detection circuit 15 extracts a value for jitter amount using a phase difference output between a clock reproduced from the HF signal and a reference clock by a PLL circuit and detects a jitter amount by the pulse width of the phase difference output.

A wobble decoder 16 demodulates a push-pull signal generated by the head amplifier 2 using the Push-pull method to obtain a wobble signal of 22.05 kHz contained in a pre-groove signal of the disk, and also demodulates the wobble signal to extract an ATIP (Absolute Time In Pregroove), which is a time information address.

FIG. 5 shows a spindle motor 17 for driving the disk to rotate, a motor drive circuit 18 for driving the spindle motor, and a motor control circuit 19 for controlling the motor drive circuit 18. The motor control circuit 19 can control disk rotation by the CLV method using a synchronization signal and a reproduction clock extracted from the data signal recorded on the disk or using the wobble signal demodulated by the wobble decoder 16. The motor control circuit 19 can also control disk rotation by the CAV method using a pulse signal from a frequency generator (FG) 20 which generates a pulse signal in accordance with the rotation of the spindle motor 17.

A speed setting circuit 21 controls the motor control circuit 19 based on the recording speed and the reproducing speed requested by the master device which is connected to the connection terminal 6, to thereby set the rotation speed of the disk. When the rotation speed of the disk is set by the speed setting circuit 21, an operation clock of each circuit which performs reproduction or recording operation changes based on the rotation speed of the disk, and the head servo circuit 3 and the emission power of the optical head 1 are also controlled in accordance with the rotation speed of the disk, so that the reproducing operation and the recording operation can be performed in accordance with the set rotation speed of the disk.

When the rotation speed of the disk is set by the speed control circuit 21 at the time of recording, the operation of the encoder 7 and the head output control circuit 9 is switched in accordance with that rotation speed.

Because the half of the optical spot S3 on the outer peripheral side of the disk is emitted onto the n-th signal track which is also irradiated with the optical spot S1 of the main beam and optical spot S3 is located after the optical spot S1 with regard to recording time sequence, the output c2 generated from one segment region of the light receiving sub-region C is a HF signal obtained by reading a data signal written onto the disk with the optical spot S1 of the main beam. This HF signal is amplified by the HF amplifier 30.

As described above, in the on-track state in which the optical spot S1 is correctly located on the n-th signal track of the disk, the optical spot S3 of the succeeding sub-beam is located such that the outer peripheral half of the area thereof is projected onto the n-th signal track and the inner peripheral half is projected onto the interval 102 between the n-th signal track and the (n−1)-th signal track on the inner peripheral side. In this setting, the amplitude of the output c2 of one segment region of the light receiving sub-region C, namely the amplitude of the HF signal of the disk which is read by the succeeding sub-beam, is monitored, and the optics are set so as to maximize this amplitude.

It is also possible, in the on-track state of the optical spot S1, to change the angle of each sub-beam to thereby locate the inner peripheral half of the optical spot S3 on the (n−1)-th signal track adjacent, on the inner peripheral side, to the n-th track, so that the HF signal of the (n−1)-th signal track is read with the output c1 from one segment region of the light receiving sub-region C.

The recording operation of the optical disk recording apparatus configured as shown in FIG. 5 will he described. In the following description, the operation of elements identical or similar to those in FIG. 1 will not be described.

When disk recording is requested by the master device connected with the connection terminal 6, each circuit is controlled to perform recording operation in accordance with the request. At this time, the motor control circuit 19 controls the motor drive circuit 18 for driving the disk at a rotation speed corresponding to the recording speed requested by the speed setting circuit 21.

Before beginning recording onto the disk, at the set recording speed, the emission power of the optical head 1 is set at an optimum recording level for recording the data which will have the minimum error rate when reproduced. This optimum recording level is set by writing test data onto the calibration area provided in the inner most periphery of the disk while the emission power is changed in steps.

With the configuration of FIG. 5, as in the configuration in FIG. 1, in order to obtain an appropriate HF signal from the signal track adjacent, on the inner peripheral side of the disk, to the n-th signal track, using the succeeding sub-beam, the HF signal read by the sub-beam is sampled at periods when the emission power of the optical head 1 is at predetermined one of the recording and reproducing levels in disk recording.

In order to perform such HF signal sampling, a sample-hold circuit 11 is provided in FIG. 5. The sampling period and the holding period of the sample-hold circuit 11 is set in accordance with an EFM recording signal generated from the head output control circuit 9, and the sample-hold circuit 11 operates such that it samples the HF signal when the EFM signal is at the recording level and holds the sampled HF signal when the EFM signal is at the reproducing level.

Figure 7:
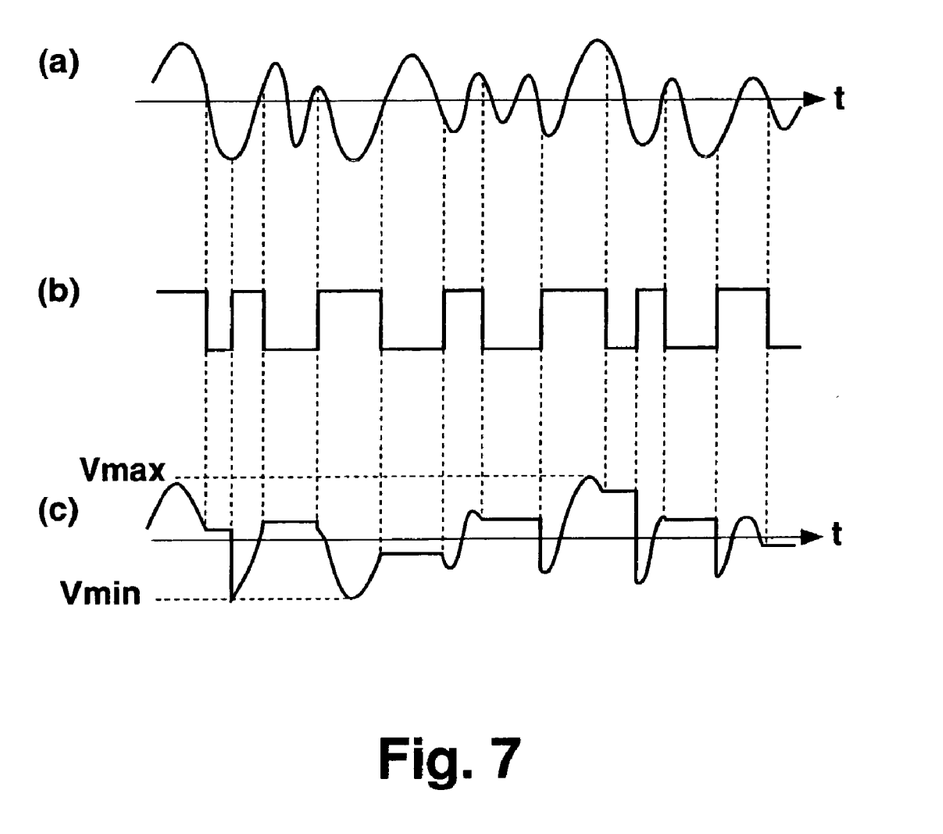
FIG. 7 is a diagram for explaining a signal output from a sample-hold circuit 11 of the apparatus of FIG. 5.

Referring to FIG. 7, when the output c2 from one segment region of the light receiving sub-region C corresponding to the outer peripheral half of the disk in the optical spot S3, namely the HF signal which is read using the succeeding sub-beam, has a waveform (a) shown in FIG. 7 and the EFM recording signal generated from the head output control circuit 9 has a pulse waveform (b) shown in FIG. 7, the HF signal is converted in the sample-hold circuit 11 into a signal having a waveform (c) shown in FIG. 7. Although the waveform information of this converted HF signal at the holding period is not obtained, the HF signal which is extracted during the sampling period can be used to detect the peak level Vmax and the bottom level Vmin thereof, and a β value can be detected by the β value detection circuit 13 using the HF signal which indicates the EFM recording signal actually recorded on the disk.

The HF signal selected by the selection circuit 12 is also supplied to the jitter amount detection circuit 15, which detects a jitter amount of the HF signal read from the succeeding sub-beam when actually recording data onto the program area of the disk.

Although this HF signal has been converted by the sample-hold circuit 11, the jitter amount detection circuit 15 can detect a jitter amount of the HF signal corresponding to the EFM recording signal actually recorded onto the disk, because the EFM recording signal actually recorded onto the disk is reflected in the HF signal which is extracted at the sampling period and edge portions of the EFM recording signal can be correctly extracted at the sampling period.

At this point, if the jitter amount detected by the jitter amount detection circuit 15 does not fall within the predetermined allowable range, the rotation speed of the disk is lowered by the speed setting circuit 21 so as to decrease the recording speed. This is performed according to the determination that such a situation will make correct reading of the recorded EFM signal from the disk impossible such that the result would be recording failure. Here, the rotation speed of the disk may be reduced continuously (linearly, for example), or may be reduced step by step within a predetermined range of rotation speed steps.

When the recording speed is reduced in this manner, the ratio of the jitter amount with respect to the recording mark is decreased with the reduction of the rotation speed of the disk. Then, when the recording speed is reached the level at which the jitter amount detected by the jitter amount detection circuit 15 falls within the allowable range, recording is continued at this recorded speed.

In this variation example, the CAV is employed for disk rotation at the maximum recoding speed and the CLV is employed for disk rotation at lower speeds.

The CLV is a specified disk rotation method for CDs, and therefore recording is performed without imposing a burden to a circuit when the CLV technology is used. This is also true when the ZCLV is used for disk rotation instead of the CAV.

Accordingly, in the apparatus of this variation example, when the detected jitter amount is found to be outside the predetermined allowable range when recording with the CAV method, the disk rotation method is switched from CAV to CLV for recording. As a result, due to a combination of a change of recording operation conditions and a decrease in the recording speed, a jitter amount in a data signal recorded on the disk is decreased.

Further, when the detected jitter amount is found to be outside the predetermined allowable range when recording with the CLV method, the disk rotation method is not switched and recording is performed using CLV at a lower recording speed. Consequently, the amount of jitter in a data signal recorded on the disk is decreased.

Although in the configuration of FIG. 5, the ±1st order diffraction beams are used as sub-beams for reading a signal recorded on the disk, it is also possible to instead use the ±2nd or higher order diffraction beam, although the light amount is decreased. In such a case, it is possible to achieve the arrangement of the ±1st order beams which gives priority to the tracking control, so that a tracking error signal with a good quality can be obtained.

As described above, according to the present invention, when recording data on the program area of the disk, the recording state of a data signal actually recorded onto the disk immediately before is detected. Accordingly, it is possible to set the emission power of the optical head at the optimum recording level for disk recording.

Further, according to the present invention, in order to detect the recording state of a data signal actually recorded on the disk, a sub-beam which is located after the main beam in terms of recording time sequence is used and a data signal is read from the disk at a period when the emission power of the optical head is at the recording level. Therefore, the S/N of the data signal read from the disk can be made preferable.

Also, in a photodetector of the optical head which adopts the Differential Push-pull method, a light receiving sub-region corresponding the ± first order beams of a diffraction beam is divided into two segments in the signal track direction. According to the present invention, however, in the on-track state of an optical spot corresponding to the main beam, a half portion of an optical spot corresponding to the succeeding sub-beam is located on the adjacent signal track, so that a data signal with a good quality can be obtained from one of the segment regions of the light receiving sub-region.

Moreover, according to the present invention, because a detection circuit for detecting the recording state of data signal recorded on the disk is used both for reproducing data on the calibration area and for recording a data signal onto the disk, a reasonable circuit configuration can be achieved.

Also, according to the present invention, when recording data on the program area of the disk, a jitter amount of a data signal actually recorded on the disk immediately before is detected and the recording speed is switched based on the jitter amount thus detected. Therefore, when high speed recording is set in which a jitter amount is too high and the recorded data cannot be reproduced, the recording speed can be automatically switched to a recording speed at which a jitter amount falls within the allowable range so that recording can continue.

In particular, because the disk rotation method is switched to change the recording operation conditions when reducing the recording speed, due to the combination of a change of recording operation conditions and a reduced recording speed, it is expected that a jitter amount of a data signal recorded on the disk can be significantly reduced.

Further, according to the present invention, because a sub-beam succeeding the main beam is used to detect a data signal actually recorded on the disk in order to detect a jitter amount of the data signal on the disk, detection of the jitter amount can be reliably performed.

Moreover, because according to the present invention a data signal is read out from the disk at a period when the emission power of the optical head is at the recording level, the S/N of the data signal read from the disk can be made preferable.

While the preferred embodiments of the present invention have been described using specific terms, such description is for illustrative purposes only, and it is to be understood that changes and variations may be made without departing from the spirit or scope of the appended claims.

What is claimed is:

1. An optical disk recording apparatus comprising:
    an optical system for diffracting an optical beam emitted from a light source to form a main beam for use in writing a data signal on a disk and a succeeding sub-beam following the main beam, and for irradiating the disk with the main beam and the succeeding sub-beam, wherein the positional relationship of the main beam and the sub-beam is defined such that when writing a data signal on the disk, a site on the disk at which a data signal is written by the main beam is irradiated with the succeeding sub-beam afterwards;
    a photodetector including a succeeding light receiving sub-region for detecting light of the succeeding sub-beam reflected from the disk;
    a first light source control circuit for controlling switching of an emission power of the light source between a recording level for forming a recording mark on the disk and a recording pause level for not forming a recording mark on the disk in accordance with a data signal to be written on the disk;
    a sampling circuit for sampling a signal at periods when the emission power of the light source is at predetermined one of the recording level and the recording pause level, among detection signals output from the succeeding sub-beam receiving region of the photodetector; and
    a recording state detection circuit for detecting the recording state of a data signal written on the disk with the main beam, based on an output signal from the sampling circuit.

2. An optical disk recording apparatus according to claim 1, further comprising:
    a second light source control circuit for controlling the emission power at the recording level in the first light source control circuit based on a detection result of the recording state detection circuit.

3. An optical disk recording apparatus according to claim 2, wherein
    the sampling circuit samples a signal at periods when the emission power of the light source is at the recording level.

4. An optical disk recording apparatus according to claim 1, wherein
    the optical system diffracts the optical beam to further form a preceding sub-beam preceding the main beam,
    the main beam is a 0th order diffraction beam formed by a diffraction grating, and one of the preceding sub-beam and the succeeding sub-beam is a $+1^{st}$ order diffraction beam formed by the diffraction grating and the other is a $-1^{st}$ order diffraction beam formed by the diffraction grating,
    the photodetector further includes a preceding light receiving sub-region for receiving light of the preceding sub-beam reflected from the disk, each of the succeeding light receiving sub-region and the preceding light receiving sub-region being divided into two segment regions by a dividing line extending in a direction corresponding to the extending direction of a signal track of the disk,
    the optical disk recording apparatus further comprises a head servo circuit for performing tracking control of a Differential Puxh-pull method based on an output from each segment region of the succeeding light receiving sub-region and the preceding light receiving sub-region, and
    the sampling circuit samples an output signal from one of two segment regions of the succeeding light receiving sub-region.

5. An optical disk recording apparatus according to claim 1, further comprising:
    setting means for setting the emission power at the recording level of the light source based on a detection result of the recording state of a test signal with respect to a calibration area which is provided on the disk, the recording state of the test signal being detected from a signal obtained as a result of writing of the test signal which has been written into the calibration area,
    wherein the setting means detects the recording state of the test signal by supplying, as an input, a signal indicative the result of reading the writing the test signal to the recording state detection circuit.

6. An optical disk recording apparatus according to claim 1, wherein
    the recording state detection circuit for detecting a β value from an input signal.

7. An optical disk recording apparatus according to claim 1, wherein
    the recording state detection circuit includes a jitter amount detection circuit for detecting, from an input signal, a jitter amount of a data signal recorded on the disk, and
    the optical disk recording apparatus further comprises a speed control circuit for controlling a recording speed for recoding a data signal onto the disk, based on the jitter amount detected by the jitter amount detection circuit.

8. An optical disk recording apparatus according to claim 7, wherein
    the sampling circuit samples a signal at a period when the emission power of the light source is at the recording level.

9. An optical disk recording apparatus according to claim 7, wherein
    first and second disk rotation methods are supported as a control method for rotation speed of the disk, the first disk rotation method, of the two disk rotation methods, being determined as a method which is employed when the recording speed is maximum in a selectable range, and when disk recording is performed using the first disk rotation method for controlling the rotation speed of the disk, the speed control circuit switches the disk rotation control method from the first method to the second method when the jitter amount detected by the jitter amount detection circuit is determined to be outside a preset allowable range.

10. An optical disk recording apparatus according to claim 9, wherein the second disk rotation method is a constant linear velocity method.

11. An optical disk recording apparatus according to claim 10, wherein the first disk rotation method is a constant angular velocity method.

12. An optical disk recording apparatus according to claim 10, wherein the first disk rotation method is a zone constant linear velocity method.

13. An optical disk recording apparatus according to claim 9, wherein when disk recording is performed using the second disk rotation method for controlling the rotation speed of the disk, the speed control circuit reduces the rotation speed of the disk while controlling disk rotation by the second disk rotation method when the jitter amount detected by the jitter amount detection circuit is determined to be outside a preset allowable range.

14. A control method for an optical disk recording apparatus, wherein the optical disk recording apparatus comprises:

an optical system for diffracting an optical beam emitted from a light source to form a main beam for use in writing a data signal on a disk and a succeeding sub-beam following the main beam, and for irradiating the disk with the main beam and the succeeding sub-beam, wherein the positional relationship of the main beam and the sub-beam is defined such that when writing a data signal on the disk, a site on the disk at which a data signal is written by the main beam is subsequently irradiated with the succeeding sub-beam;

a photodetector including a succeeding light receiving sub-region for detecting light of the sub-beam reflected from the disk; and the first light source control circuit for controlling switching of an emission power of the light source between a recording level for forming a recording mark on the disk and a recording pause level for not forming a recording mark on the disk;

the control method comprising:

a sampling step of sampling a signal at periods when the emission power of the light source is at predetermined one of the recording level and the recording pause level, among detection signals output from the succeeding sub-beam light receiving region of the photodetector;

a recording state detecting step of detecting the recording state of a data signal written on the disk with the main beam, based on the signal sampled in the sampling step; and a control step of performing a predetermined control operation based on the recording state detected in the recording state detection step.

15. A control method according to claim 14, wherein in the sampling step, a signal at a period when the emission output of the light source is at the recording level is sampled.

16. A control method according to claim 14, wherein the control step includes a step of controlling the recording level of the first light source control circuit based on the recording state detected in the recording state detecting step.

17. A control method according to claim 14, wherein, the optical disk recording apparatus is configured to write a test signal in a calibration area provided on the write a test signal in a calibration area provided on the disk, and a detection circuit for performing the recording state detection step is used both for detection of the recording state when writing a data signal onto the disk and for detection of the recording state of a test signal written on the calibration area.

18. A control method according to claim 14, wherein the recording state detection step includes a step of detecting a jitter amount of a data signal recorded on the disk based on the signal sampled in the sampling step, and the control step includes a step of controlling a recording speed for. recoding a data signal onto the disk based on the jitter amount detected by the jitter amount detection circuit.

19. A control method according to claim 18, wherein first and second disk rotation methods are supported as a control method for rotation speed on the disk, the first disk rotation method, being determined as a method which is employed when the recording speed is maximum in a selectable range, and the step of controlling the recording speed for recording a data signal onto the disk includes a step of switching the disk rotation control method from the first method to the second method when the jitter amount detected by the jitter amount detection circuit is determined to be outside a preset allowable range, when disk recording is performed using the first disk rotation method for controlling the rotation speed of the disk.

20. A control method according to claim 19, wherein the step of controlling the recording speed for recording a data signal onto the disk further includes a step of reducing the rotation speed of the disk while controlling disk rotation by the second disk rotation method, when the jitter amount detected by the jitter amount detection circuit is determined to be outside a preset allowable range when disk recording is performed using the second disk rotation method for controlling the rotation speed of the disk.

* * * * *